(12) United States Patent
Kelly et al.

(10) Patent No.: US 9,882,462 B2
(45) Date of Patent: Jan. 30, 2018

(54) ADAPTIVE DUAL STAGE IDENTIFICATION CONTROL METHOD FOR A POWER STAGE OF A POWER CONVERTER

(71) Applicant: IDT Europe GmbH, Dresden (DE)

(72) Inventors: Anthony Kelly, Co. Limerick (IE); Adrian Ward, Co. Clare (IE)

(73) Assignee: IDT Europe GmbH, Dresden (DE)

( * ) Notice: Subject to any disclaimer, the term of this patent is extended or adjusted under 35 U.S.C. 154(b) by 0 days.

(21) Appl. No.: 14/906,900

(22) PCT Filed: Aug. 11, 2014

(86) PCT No.: PCT/EP2014/067162
§ 371 (c)(1),
(2) Date: Jan. 21, 2016

(87) PCT Pub. No.: WO2015/022291
PCT Pub. Date: Feb. 19, 2015

(65) Prior Publication Data
US 2016/0156262 A1    Jun. 2, 2016

Related U.S. Application Data

(60) Provisional application No. 61/864,859, filed on Aug. 12, 2013, provisional application No. 61/868,161, filed on Aug. 21, 2013.

(51) Int. Cl.
*H02M 3/156* (2006.01)
*H02M 1/00* (2006.01)
(Continued)

(52) U.S. Cl.
CPC ............ *H02M 1/00* (2013.01); *G05B 13/044* (2013.01); *H02M 1/36* (2013.01); *H02M 3/155* (2013.01);
(Continued)

(58) Field of Classification Search
CPC ...... H02M 3/155; H02M 3/156; H02M 3/157; H02M 3/158; H02M 2003/1566; G05F 1/56; G05F 1/575
(Continued)

(56) References Cited

U.S. PATENT DOCUMENTS 5,982,160 A * 11/1999 Walters ................. H02M 3/156
                                                               323/222
6,952,093 B1   10/2005 Broach et al.
(Continued)

FOREIGN PATENT DOCUMENTS

CN         102025278 A      4/2011
EP         0 533 498 A1     3/1993
(Continued)

OTHER PUBLICATIONS

Morroni, J., R. Zane, and D. Maksimovic. Design and Implementation of an Adaptive Tuning System Based on Desired Phase Margin for Digitally Controlled DC-DC Converters. Power Electronics, IEEE Transactions on, 2009. 24(2): p. 559-564.
(Continued)

*Primary Examiner* — Adolf Berhane
(74) *Attorney, Agent, or Firm* — Heslin Rothenberg Farley & Mesiti P.C.

(57) ABSTRACT

A control method is provided for a power converter configured to generate an output voltage according to a control law controlling a power stage. The method comprises a dual stage identification process for identifying parameters of the power stage. The method includes, in a first stage, identifying at least one parameter of the power stage during ramp up of the power converter and adapting the control law to the identified at least one parameter of said power stage for operating the power converter. The method further includes, in a second stage, determining a response of the power stage;
(Continued)

identifying at least one other parameter of the power stage by characterizing the response; and further adapting the control law according to a characteristic of the response.

13 Claims, 7 Drawing Sheets

(51) Int. Cl.
  *G05B 13/04* (2006.01)
  *H02M 1/36* (2007.01)
  *H02M 3/155* (2006.01)
(52) U.S. Cl.
  CPC .... *H02M 3/156* (2013.01); *H02M 2001/0016* (2013.01); *H02M 2001/0025* (2013.01)
(58) Field of Classification Search
  USPC ................................ 323/265, 282–285, 351
  See application file for complete search history.

(56) References Cited

U.S. PATENT DOCUMENTS

| | | | |
|---|---|---|---|
| 7,432,692 B2 | 10/2008 | Wang et al. | |
| 7,630,779 B2 | 12/2009 | Kelly | |
| 8,102,164 B2* | 1/2012 | Colbeck | H02M 1/4225 323/271 |
| 8,143,874 B2* | 3/2012 | Templeton | H02M 3/157 323/283 |
| 8,395,365 B2* | 3/2013 | Latham | H02M 3/158 323/283 |
| 8,773,088 B2* | 7/2014 | Menegoli | H02M 3/158 323/267 |
| 8,786,269 B2* | 7/2014 | Menegoli | H02M 3/156 323/282 |
| 8,901,908 B2* | 12/2014 | Tang | H02M 3/157 323/283 |
| 8,907,644 B2* | 12/2014 | Menegoli | H02M 3/158 323/271 |
| 8,975,887 B2* | 3/2015 | Galbis | G05F 1/46 323/271 |
| 9,030,178 B2* | 5/2015 | Chang | H02M 1/36 323/276 |
| 2010/0057223 A1 | 3/2010 | Kelly | |
| 2011/0063881 A1 | 3/2011 | Dabak et al. | |
| 2016/0141954 A1* | 5/2016 | Kelly | H02M 1/36 323/234 |
| 2017/0285679 A1* | 10/2017 | Szczeszynski | G05F 3/02 |

FOREIGN PATENT DOCUMENTS

| | | |
|---|---|---|
| WO | 97/07444 A2 | 2/1997 |
| WO | 2015/000916 A1 | 1/2015 |

OTHER PUBLICATIONS

Stefanutti, W., et al. Autotuning of Digitally Controlled Buck Converters based on Relay Feedback. in Power Electronics Specialists Conference, 2005.2005. Recife, Brazil.
Costabeber, A., et al., Digital Autotuning of DC-DC Converters Based on a Model Reference Impulse Response. Power Electronics, IEEE Transactions on, 2011. 26(10): p. 2915-2924.
Miao, B., R. Zane, and D. Maksimovic. Practical on-line identification of power converter dynamic responses. in Applied Power Electronics Conference. 2005. Austin, TX, USA: IEEE.
Kelly, A. and K. Rinne. Control of DC-DC Converters by Direct Pole Placement and Adaptive Feedforward Gain Adjustment. in Applied Power Electronics Conference. 2005. Austin, Texas: IEEE.
Kelly, A. and K. Rinne. A self-compensating adaptive digital regulator for switching converters based on linear prediction. in Applied Power Electronics Conference and Exposition, 2006. APEC '06. Twenty-First Annual IEEE. 2006.
International Search Report for International Application No. PCT/EP2014/067162, dated Oct. 30, 2014.
Initial Office Action dated Sep. 4, 2017, issued in CN Application No. 201480044677.3.

\* cited by examiner

ADAPTIVE DUAL STAGE IDENTIFICATION CONTROL METHOD FOR A POWER STAGE OF A POWER CONVERTER

CROSS REFERENCE TO RELATED APPLICATIONS

This application is a national stage filing under section 371 of International Application No. PCT/EP2014/067162, filed on Aug. 11, 2014, and published in English on Feb. 19, 2015, as WO 2015/022291 A1 and claims priority of U.S. Provisional applications No. 61/864,859 filed on Aug. 12, 2013 and No. 61/868,161 filed on Aug. 21, 2013, the entire disclosure of these applications being hereby incorporated herein by reference.

FIELD OF THE INVENTION

The present invention relates to an adaptive dual stage identification control method for a power stage of a power converter and a related power converter. The present invention specifically relates to DC/DC conversion in a power converter that automatically characterizes the power stage of a DC-DC converter and adapts a control law in response to the characterization in a dual identification process.

BACKGROUND OF THE INVENTION

Prior art systems have addressed the issue of DC-DC converter tuning by manually adjusting the controller response through a means convenient and accessible to the user e.g. see reference [1], listed below. In below listed reference [2] it was recognized that a DC-DC conversion power stage had properties that led to a convenient method to scale a pre-designed compensator so that its open-loop crossover frequency and phase margin remained approximately constant as power stage parameters varied, lending itself to manual tuning by the end user without having to re-design the compensator.

Adaptive control methods have been applied to the problem of DC-DC converter tuning. In below listed references [3] and [4], non-parametric methods were applied, involving the addition of a sinewave disturbance (reference [3]) or induced loop oscillation (reference [4]) into the system to measure the loop characteristics such as phase margin. However, these methods may be affected by outside disturbances which may be common in Point of Load regulation applications for example, and furthermore, may introduce noticeable disturbances on the output voltage affecting regulation performance.

In below listed reference [5], a model reference impulse response method is introduced in which two methods are proposed to characterize the impulse response of the system involving a one-time fast characterization of the system and a long-term statistical characterization. Whilst the statistical method proposed in below listed references [5] and [6] can be used online, the convergence time is too long for many applications due to the length of the required noise sequence and the introduced noise disturbance may be undesirable. The impulsive perturbation method suggested in reference [5] requires an experimental impulse to be introduced repeatedly whilst a 2-parameter search is carried out to determine the regulator parameters. This introduces disturbances during the tuning, suffers from similar drawbacks to references [3, 4] regarding sensitivity to outside disturbances and non-optimum convergence in the presence of noise.

The controller of below listed reference [7] shows how an LMS filter can be used in a feedforward controller to tune a single gain but does not address the issue of adaptive control of the general transfer function of the regulator. That issue is addressed in below lisated references [8] and [9] where a prediction error filter (PEF) is used to tune the loop based on minimisation of the power of the prediction error. However, the pseudo-open loop requirement for controller adaptation may lead to initial output voltage regulation being far less than required, and the two-parameter control system may be prone to divergence and therefore an unstable controller may result in certain circumstances. These issues are addressed in below listed reference [10] where the PEF is utilised to adjust the balance between two controllers. But there are several drawbacks, for example: i) the requirement to pre-design and to implement two controllers is over complicated for many users;

ii) the iterative minimisation of the prediction error takes some time which means that regulation is compromised during the convergence time because the controller is initially too conservative;

iii) the requirement for common state variables in the two fixed controllers means they cannot be integral controllers and this lack of a capability to vary the integral gain of the controller is a limiting factor in preserving the pulse response of the system.

Also references [8], [9] and [10] are all limiting the type of control structure to ARMA (zero/pole/non-integral) type structures with a feedforward element for steady-state regulation. The vast majority of controllers are PID and there is a distinct advantage in being able to tune or adjust PID compensators automatically without limitation.

PCT/EP2014/063987 relates to a method to adjust a compensator across the end users design space, e.g. output capacitance, and a means for the end user to configure the compensator such that the most suitable adjustment value is selected. Considering that it is advantageous to retain the response of the original system whilst a power stage parameter is changed, e.g. the capacitance C, it is desired to determine the manner in which the compensator must change in order to achieve a similar response. That is, this objective may be realized by designing a base compensator in the usual way, and devising a means to alter the compensation according the new value of C for example so as to maintain system performance. It has been shown that this relationship can be maintained, for example, if the proportional gain $K_p$, the integral gain $K_i$ and and the differential gain $K_d$ of a PID controller are altered from the original values in the following manner:

$$F = C_{new}/C,$$

$$K_{inew} = K_i * \mathrm{sqrt}(F),$$

$$K_{dnew} = K_d * F,$$

$$K_{pnew} = K_p * F,$$

where $K_i$, $K_p$ and $K_d$ represent the gains of the original PID controller (i.e. original set of compensator coefficients), $K_{inew}$, $K_{pnew}$, $K_{dnew}$ represent the altered values respectively to maintain the system response and $C_{new}$ and C represent the new and original value of the bulk capacitance. It will be clear that the capacitance C is being used as an example and the system is not limited in this regard but can also adjust for variations in other parameters (e.g. L), in a similar way.

List of References

[1] Circuit and method for changing transient response characteristics of a DC/DC converter module" U.S. Pat. No. 7,432,692, 2008
[2] Kelly, A. A system and Method for Design and Selecting Compensators for a DC-DC Converter. USPTO Provisional Patent Application, July 2013
[3] Morroni, J., R. Zane, and D. Maksimovic. Design and Implementation of an Adaptive Tuning System Based on Desired Phase Margin for Digitally Controlled DC-DC Converters. Power Electronics, IEEE Transactions on, 2009. 24(2): p. 559-564.
[4] Stefanutti, W., et al. Autotuning of Digitally Controlled Buck Converters based on Relay Feedback. in Power Electronics Specialists Conference, 2005. 2005. Recife, Brazil.
[5] Costabeber, A., et al., Digital Autotuning of DC-DC Converters Based on a Model Reference Impulse Response. Power Electronics, IEEE Transactions on, 2011. 26(10): p. 2915-2924.
[6] Miao, B., R. Zane, and D. Maksimovic. Practical on-line identification of power converter dynamic responses. in Applied Power Electronics Conference. 2005. Austin, Tex., USA: IEEE.
[7] Kelly, A. and K. Rinne. Control of DC-DC Converters by Direct Pole Placement and Adaptive Feedforward Gain Adjustment. in Applied Power Electronics Conference. 2005. Austin, Tex.: IEEE.
[8] Kelly, A. and K. Rinne. A self-compensating adaptive digital regulator for switching converters based on linear prediction. in Applied Power Electronics Conference and Exposition, 2006. APEC '06. Twenty-First Annual IEEE. 2006.
[9] Kelly, A. A self compensating closed loop adaptive control system U.S. Pat. No. 7,630,779, USPTO
[10] Kelly, A. Adaptive control system for a DC-DC power converter, United States Patent Application 2010005723

Utilizing the tuning method as disclosed in PCT/EP2014/063987 provides a suitable controller to preserve the system response characteristics of a DC-DC converter as the power stage parameters vary and is compatible with standard PID control structures. But a means to characterize the power stage and to vary the controller characteristics automatically in response to the characterized power stage is lacking.

Therefore what is required is a method that will reliably automatically characterize the power stage of a DC-DC converter and tune a compensator in response to the characterization.

DISCLOSURE OF THE INVENTION

It is an objective of the present disclosure to provide a control method for a power stage of a power converter that automatically characterizes the power stage of the power converter and adapts a control law for controlling the power stage in response to the characterization.

The present invention relates to a control method for a power converter configured to generate an output voltage according to a control law controlling a power stage. The method comprises a dual stage identification process for identifying parameters of the power stage.

The method comprises in a first stage identifying at least one parameter of the power stage during ramp up of the power converter and adapting the control law to the identified at least one parameter of said power stage for operating said power converter. Adapting the control law may comprise pre-initializing a compensator implementing the control law with the knowledge of the identified at least one parameter. Generally the control law is implemented in a compensator. Thus, in the first stage the method adjusts the compensator parameters upon identification of the at least one parameter of the power stage, using that new information to correct the compensation of the control loop in light of the identified value of the at least one parameter, thus providing a superior response and a more robust power compensator.

The method further comprises in a second stage determining a response of the power stage; identifying at least one other parameter of the power stage by characterizing the response; and further adapting the control law according to a characteristic of the response. The response may be response to any loop disturbance, for example a load step response. It may be any similar loop disturbance with an observed effect on the output voltage to the load. For example, disturbances in the duty cycle or voltage set-point would also produce a load response on the output voltage which can be designed to be the objective response.

The dual stage identification process thus provides a superior response and a more robust power compensator.

The method may comprise a third stage that comprises continuously characterizing the load step response and continuously adapting the control law in response when operating the power converter.

One aspect of the present invention relates to the second stage of the dual stage identification process, specifically characterizing the response. Characterizing the response may comprise determining a degree of matching between the response and an objective response. This may be achieved by means of filter used for filtering the response to generate a filtered response and integrating a product of the filtered response and a delayed response.

The filter used for filtering the response may comprise an inverse filter of the objective response such that a response that exactly matches the objective response results in a zero output from the filter apart from a first sample of the filtered response.

Preferably, the delayed response is delayed by one sample to compensate for the first sample of the filtered response that is non-zero even if the filter is an inverse of the objective response. Thus, by delaying the response by one sample yields a zero value for the degree of matching between the response and the objective response.

One aspect of the present invention relates to further adapting the control law in response to the characteristic of the response. Further adapting the control law may comprise adapting the control law such that the response matches the objective response.

The method may further comprise scaling the degree of matching between the response and the objective response to adapt the control law, either by a linear time invariant gain or by a gain that is dependent on the magnitude of the response, for example a constant divided by a 2-norm of the response.

The scaled degree of matching may be provided to a compensator and used for tuning the compensator accordingly. The compensator may be a PID compensator.

One aspect of the present invention relates to the first stage of the dual stage identification process.

The power stage may be implemented such that it comprises an inductor and an output capacitor. Then the at least one parameter to be identified is generally the capacitance C or the equivalent series resistance (ESR) of the output capacitor. Moreover, identifying the inductance of the power stage may also be beneficial. Without limitation, it is clear that the control law can be adapted to any other parameters that can be readily identified.

The control law may be adapted by re-parameterizing control parameters of the control law with respect to the identified parameter by scaling the control parameters according to a deviation of the identified parameter from an expected value of the at least one parameter of said power stage. The expected value refers to a value that is to be expected from a priori information regarding the at least one parameter like the nominal value of a capacitance or inductance.

One aspect of the first stage of the dual stage identification process relates to normalization. The control law may be adapted by normalizing the identified control parameter by the expected value of said control parameter for obtaining a normalized identified parameter and scaling control parameters according to a deviation of the normalized identified parameter from a normalized expected value of the at least one parameter of said power stage.

One aspect of the present invention relates to the control law. The control law is generally defined by a transfer function having a plurality of zeros and poles. The plurality of zeros and poles of said transfer function may be determined on the basis of expected value for the at least one parameter of the power stage prior to identifying the at least one parameter of the power stage. After determining the at least one parameter of the power stage the plurality of zeros and poles of the transfer function is adapted according to the identified at least one parameter of the power stage.

Thus, compensating the control loop of the control law on the basis of known design equations for the expected values of power stage parameters gives a desired starting point for operation of the control loop before parameter identification has been completed and allows for operation in the event of poor quality identification.

The re-parameterized parameter can be used to yield the correct compensation parameters or pole-zero locations of the compensator transfer function. A lookup table may be employed to achieve this in a very computationally inexpensive manner. Likewise, re-parameterization in terms of other power stage parameters is possible or even performance objectives of the system such closed-loop bandwidth or output voltage deviation for a given load-step.

In this way, a wide variety of variations and design objectives can be catered for with a simple process of re-parameterization, normalization and scaling. The re-parameterization and normalization may be prepared offline, whilst the scaling may be achieved online using computationally inexpensive techniques such as LUTs or CSD multipliers.

In case the parameter of the power stage is the capacitance C or the ESR of the output capacitor, then the plurality of zeros and poles of the transfer function is determined on the basis of an expected value for the capacitance C or the ESR. After identifying the capacitance C or the ESR the plurality of zeros and poles of the transfer function is adapted according to the identified capacitance C or the ESR. Without limitation, it is clear that the transfer function any other parameters that can be readily identified such as output capacitor ESR and inductance of the Inductor L.

Specifically, the plurality of zeros and poles of the transfer function is adapted for a pre-defined loop bandwidth of a closed loop of the transfer function. Alternatively, in case the control law is of type PID the proportional and integral gain is adjusted to the identified capacitance C for a pre-defined loop bandwidth. In case the parameter of the power stage is the capacitance C of the output capacitor, the proportional and integral gain is adjusted to the identified capacitance C.

In case of linear response the capacitance C is identified by measuring an average inductor current $i_{L,AVG}$ during ramp up time $\Delta t$ and a voltage drop of said capacitance C at the start of the ramp up and at the end of the ramp up. The capacitance C can then be computed according to $C=I_{L,AVG}*\Delta t/\Delta V$, wherein $\Delta V$ is the difference between the voltage drop of said capacitance C between the start of the ramp up and the end of the ramp up. Thus, the capacitance C, is identified in a simple way, introducing no additional disturbance during the identification process.

In circumstances where there is a significant, unknown load current during the ramp up, it may be beneficial to correct the average inductor current such that only the current drawn by the capacitor is used for computing the capacitance. For this purpose, the average inductor current is measured when ramp up has finished so as to yield an estimated of the unknown load current during ramp up. Therefore, the capacitance can be estimated by subtracting the estimated load current from the average inductor current during ramp up.

In case the output capacitor exhibits significant ESR, the capacitance C may be identified by measuring an average inductor current $i_L$ and a voltage drop of said capacitance C during ramp up time $\Delta t$ and computing the capacitance C from a functional relationship of the average inductor current $i_L$ and the voltage drop of said capacitance C by assuming said functional relationship is exponential.

The present invention further relates to a power converter comprising a power stage controlled by a control law implemented by a compensator, means for identifying at least one parameter of said power stage during ramp-up of the power converter and means for adapting the control law of the compensator according to the identified at least one parameter of said power stage, wherein the means for adapting the control law comprise means for adapting, means for normalizing and means for scaling a parameter of the control law, the power converter further comprising means for determining a response of the stage; means for identifying at least one other parameter of the power stage by characterizing the response; and wherein the means for adapting for the control law comprise means for further adapting the control law according to a characteristic of the response.

BRIEF DESCRIPTION OF THE DRAWINGS

Reference will be made to the accompanying drawings, wherein.

DETAILED DESCRIPTION OF THE INVENTION

The present invention relates a dual stage identification process for identifying parameters of the power stage. In a first stage the bulk capacitance is identified during soft start of the power converter in order to pre-initialize compensator parameters. In a second stage other parameters of the power stage are identified by characterizing the load-step response and further the compensation according to the results is further adjusted.

Figure 1:
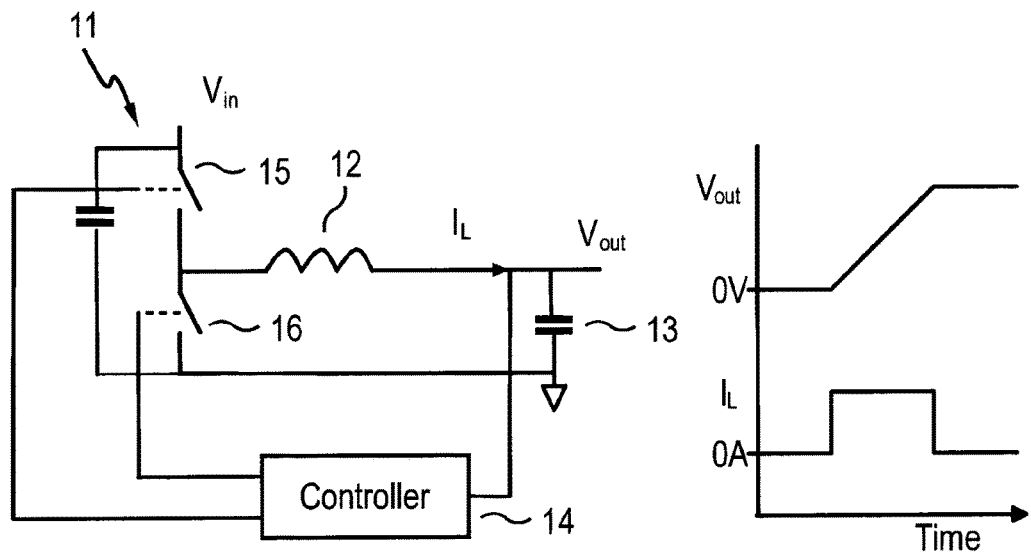
FIG. 1 shows a DC-DC power converter and its output voltage and inductor during ramp-up.

FIG. 1 shows a soft-start mechanism of a DC-DC converter comprising switched power stage 11, said power stage comprising an inductor 12 an output capacitor 13 and a compensator 14 implementing a control law for controlling the switches 15, 16 of the power stage 11. During the soft-start ramp-up the inductor current must charge the output capacitor 13. Load devices connected to the DC-DC converter are usually in active reset prior to the output voltage reaching its desired setpoint and, therefore, it can be assumed that they draw no current during the soft-start ramp up. As the total charge applied to the capacitor is proportional to the final voltage and its capacitance C, the capacitance C can be estimated as a function of the applied charge. The applied charge can easily be determined from the average current $i_{L\_AVG}$ applied during the soft-start ramp and the ramp time ($\Delta T$), where $\Delta V$ is the difference between the start-of-ramp and end-of ramp voltage. The estimated capacitance C is therefore:

$$C = i_{L\_AVG} * (\Delta T/\Delta V)$$

The average current $i_{L\_AVG}$ used in calculation can be corrected in circumstances where there is significant load current during the ramp up by measuring the current after the ramp has finished and subtracting this value from the average ramp current value.

Figure 2:
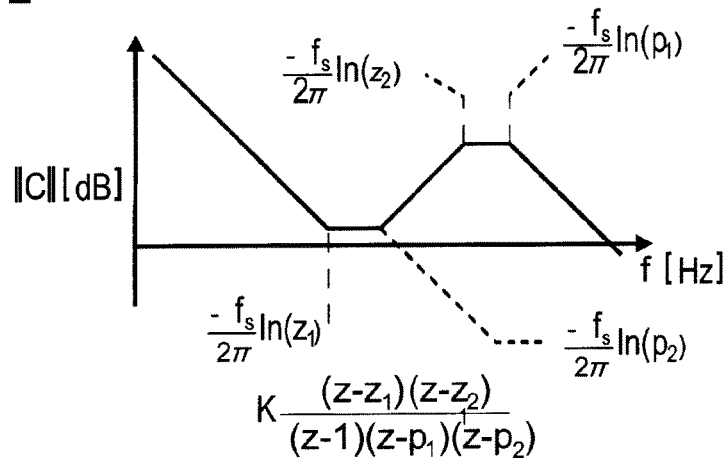
FIG. 2 shows the transfer function of a control law having two zeros and two poles.

FIG. 2 shows the magnitude versus frequency and transfer function of a discrete time "Type-3" compensator, implementing a 2-zero 2-pole plus integrator transfer function. The placement of the poles and zeros on the basis of known design equations for the expected values of power stage parameters, gives a desired starting point for operation of the control loop before parameter identification has been completed.

Figure 3:
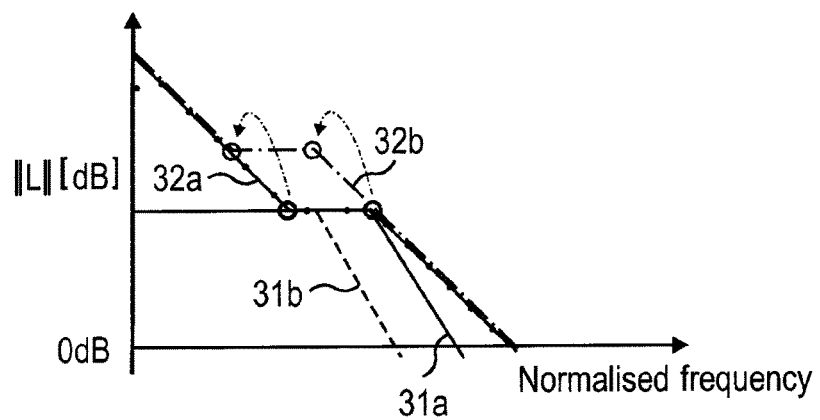
FIG. 3 shows the transfer function adjusted to different output capacitances.

The compensator has been re-parameterised in terms of the output capacitance so that scaling can be applied accordingly when a larger amount of capacitance is applied. This is illustrated in FIG. 3, where the full-line curves show the magnitude versus frequency of the power stage (line 31 a) and Loop Gain, L, (line 32 a) and indicates the expected loop behaviour. The dotted lines of FIG. 3 show how the same loop bandwidth can be achieved in a system with a larger amount of capacitance as illustrated in the dotted curve 31 b for the magnitude of the power stage and 32 b for the loop gain.

Scaling can be achieved by moving the zeros of the compensator by a corresponding amount which results in the same loop bandwidth as the original system. That is, if the capacitance value quadruples then the LC bandwidth halves and the zero locations must half in frequency compared to their original values. In this way the compensator can utilize the estimated capacitance value to modify the compensation for optimal performance by the process of normalisation and scaling with respect to the output capacitance value, C.

Figure 4:
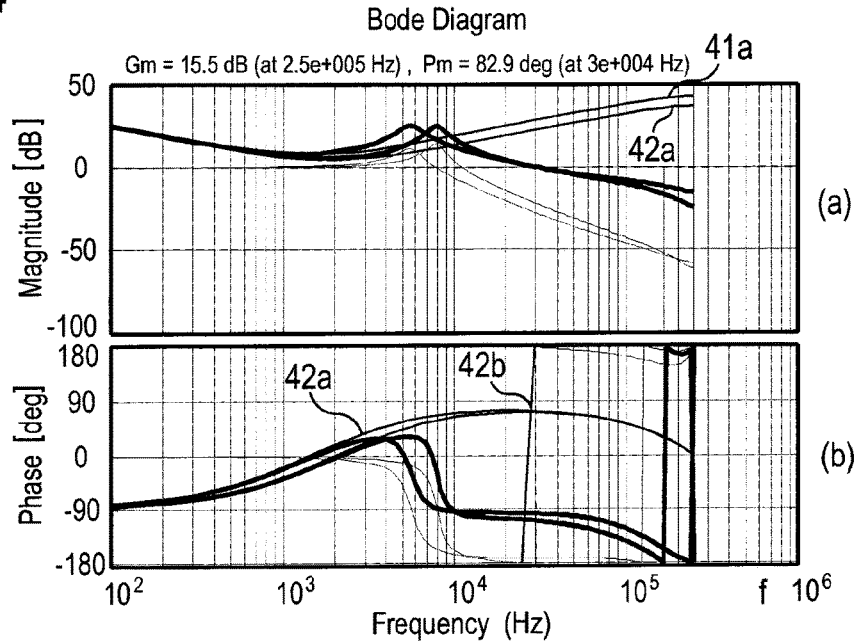
FIG. 4 shows Bode plots of the original and adjusted control law (compensator)

The adjustments are also illustrated in FIG. 4. It is apparent from the compensator adjustments (curves 41 a,b and 42 a,b), that the proportional and differential gains of a PID type may be equivalently adjusted.

Figure 5:
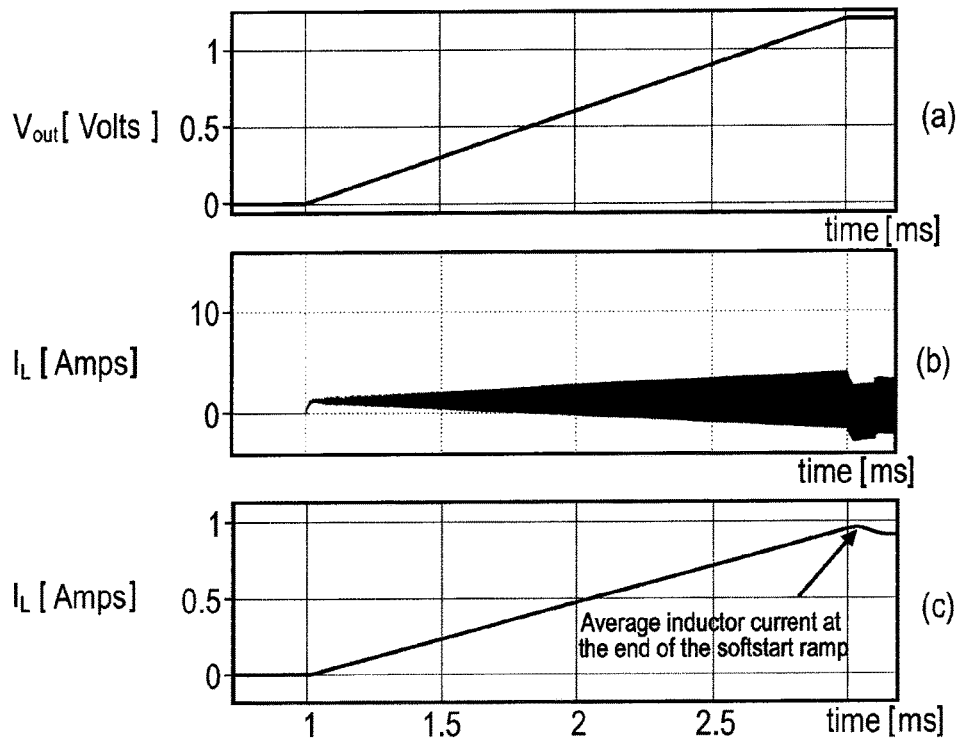
FIG. 5 shows the output voltage, inductor current and average inductor current during soft ramp-up.

The soft-start of a DC-DC converter is illustrated in FIG. 5 FIG. 5a shows the output voltage, FIG. 5b the inductor current and FIG. 5c the averaged inductor current, as a function of time. The average inductor current at the end of the soft-start ramp is shown to peak indicating the capacitors are fully charged.

Figure 6:
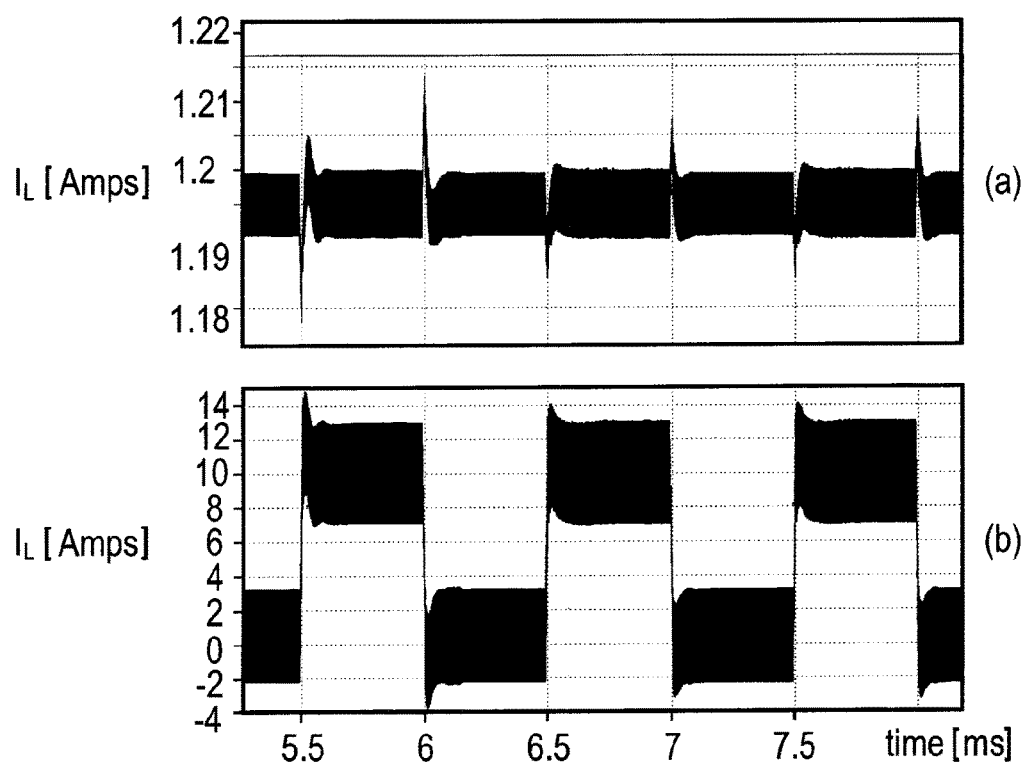
FIG. 6 shows the response of a DC-DC power converter using an updated control law(compensator) adapted to the identified capacitance.

In order to further illustrate the advantages of the invention FIG. 6 shows the power stage identification and control system of an exemplary DC-DC converter, whereby the capacitance is identified as being 4000 micro-Farads according to the average inductor current at the end of the soft-start ramp. In this case the loop has been compensated assuming 1000 micro-Farads. The identified capacitance value is updated after 6 ms. It can be seen that the transient response is improved by the identification of the output capacitance of the system.

Returning to FIG. 5, it is apparent that no disturbance has been introduced into the control loop to identify the capacitance.

Hence, the combination of capacitance identification and a simple means of compensation adjustment from a pre-determined compensator conveys significant advantages in the performance and cost of a DC-DC converter and serves as advantageous pre-stage to an even more sophisticated identification process.

The second stage of the dual stage identification process makes use of the load step response. The load-step response is a very important dynamic characteristic of DC-DC converters, but the response is dependent on both the loop gain/phase and the open-loop output impedance of the converter. Although the loop gain/phase alters the closed-loop output impedance, converters with similar loop characteristics may have different load-step responses. Therefore an approach based on characterizing the shape of the load-step response is advantageous compared to methods that characterize the loop bandwidth/phase-margin.

Figure 7:
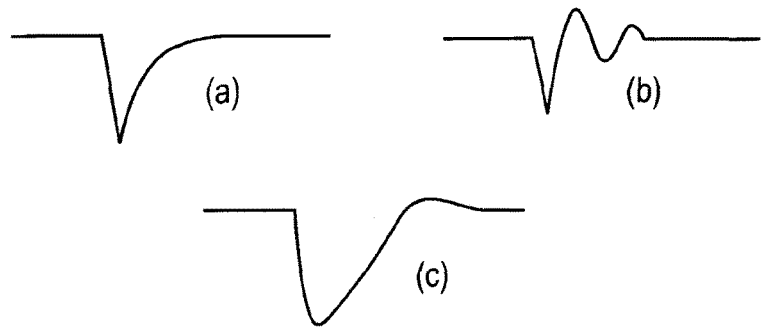
FIG. 7 shows the load step responses.

In order to characterize the load-step response it is necessary to have an objective load-step response that represents the desired response. The characterization method identifies the salient features of the load-step response in comparison to the objective load-step response. Bearing in mind, that the magnitude of the response varies with load-step magnitude and edge-rate for example, a method involving some function of the difference, i.e. subtraction, between the response and the objective response would be problematic. Referring to FIG. 7, the objective load step (a) represents the characteristics of the desired response; the under-damped (b) and over-damped (c) responses are shown for comparison.

Figure 8:
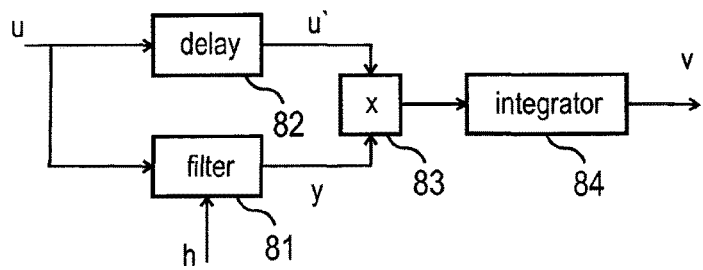
FIG. 8 shows the load step response characterization system.

In order to characterise the load-step response and quantify how well it matches the objective response the load step response (u), is applied to filter 81 as shown in FIG. 8.

The filtered load step response is multiplied, see stage 83, by the load-step response and integrated by integrator 84 in order to ascertain the degree of matching between the load step response and the objective load step response.

A delay 82 is required to remove the first sample from the filter. The filter may be designed as an inverse filter of the objective load-step response such that a load-step response that exactly matches the objective response results in a zero output from the filter, neglecting the first sample, and therefore the integral of the product of the filtered and original load step response is zero.

Figure 9:
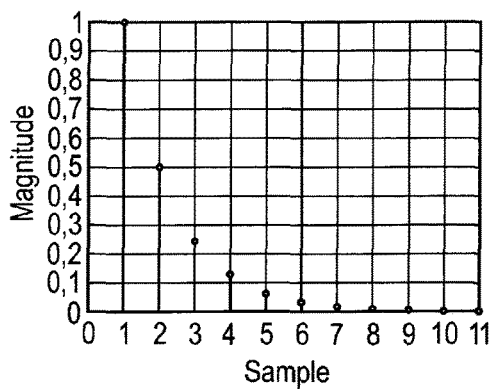
FIG. 9 shows vector u when a=0.5 (objective response)

For example, considering an objective load step response represented by the vector u (FIG. 9), where $u=[1, a, a^2, a^3, \ldots, a^n]$, applied to a filter whose impulse response is vector h where $h=[1, -a]$. The resulting signal from the filter is vector y (FIG. 10), where $y=u \cdot h$ and therefore $y=[1, a-a, a^2-a^2, a^3-a^3, \ldots, a^n-a^n]$ which simplifies to $y=[1, 0, 0, 0, \ldots, 0]$. Assuming zero valued signals apriori, delaying u by one sample yields u' where $u'=[0, 1, a, a^2, a^3, \ldots, a^n]$ and the result of the integral of the product is therefore v, where $v=u' \cdot y=0$.

Figure 11:
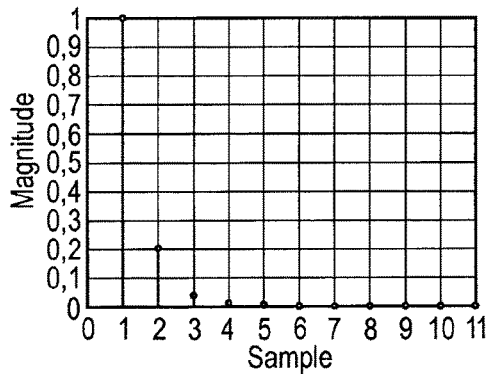
FIG. 11 shows vector u when a=0.2.
Figure 12:
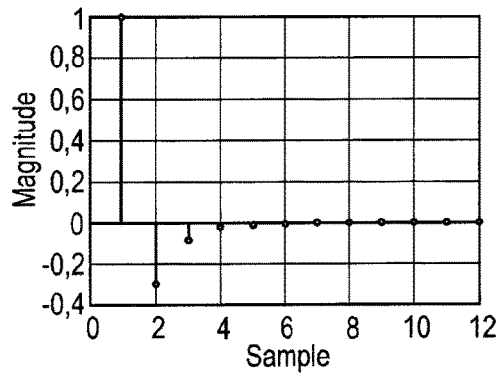
FIG. 12 shows vector y when a=0.2.
Figure 13:
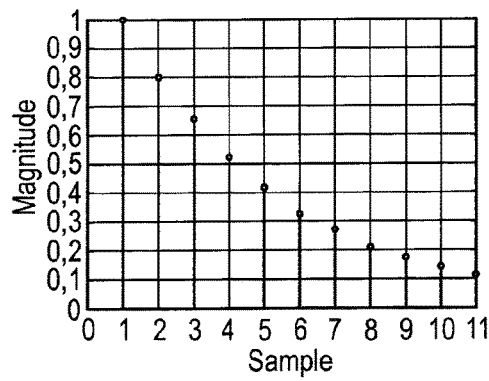
FIG. 13 shows vector u when a=0.8.
Figure 14:
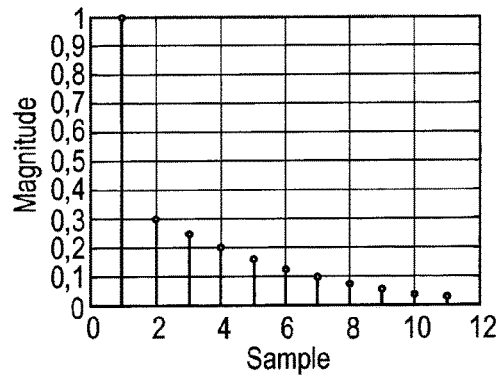
FIG. 14 shows vector y when a=0.8.

Now considering $u=[1, b, b^2, b^3, \ldots, b^n]$ applied to a filter whose impulse response is vector h where $h=[1, -a]$. The resulting signal from the filter is $y=[1, b-a, b^2-ab, b^3-ab^2, \ldots, b^n-ab^{n-1}]$. When b>a, the vector y simplifies to a vector of positive values (neglecting the first value), and the result of the integral of the product is therefore positive (FIG. 13, FIG. 14). When b<a, the vector y simplifies to a vector of negative values (neglecting the first value), and the result of the integral of the product is therefore negative (FIG. 11, FIG. 12).

Figure 15:
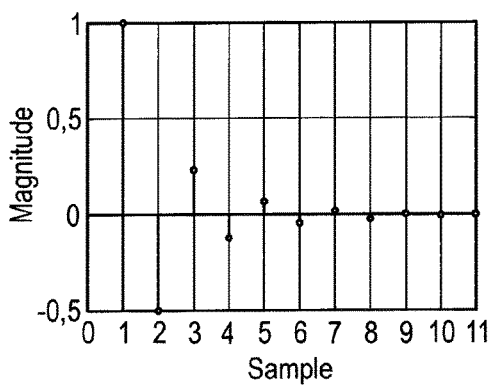
FIG. 15 shows vector u when a=−0.5.
Figure 16:
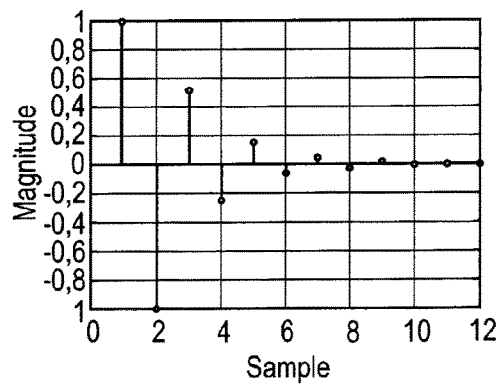
FIG. 16 shows vector y when a=−0.5.

Negative values of the parameter 'a' model an oscillatory response (FIG. 15), which results in a vector y (FIG. 16), whose integral of the product (neglecting the first value), is negative.

Therefore it is clear that the proposed characterisation system yields a value whose magnitude and sign is a measure of matching between the response and the objective response with a zero result value for an exact match to the objective response, a positive result value when 'a' is greater than the desired value and a negative result when 'a' is less than the desired value or negative.

Figure 17:
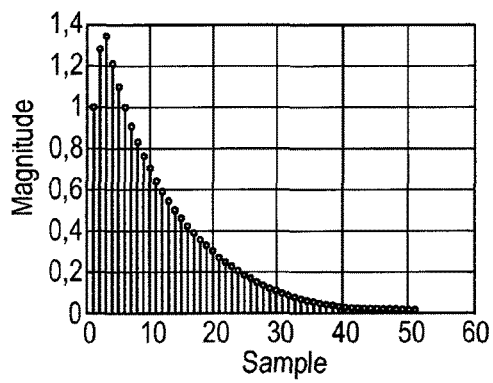
FIG. 17 shows vector u resulting from a 2nd order impulse response.
Figure 18:
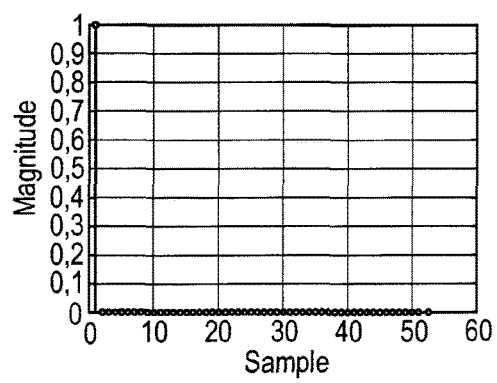
FIG. 18 shows vector y resulting from a 2nd order impulse response.

A simple two-tap (first order) FIR filter has been considered for clarity of explanation but it is clear that higher order FIR filters or IIR filters may be employed to characterise higher order objective responses. For example the objective response vector equal to the impulse response of a filter whose transfer function is $(1-0.1z^{-1})/(1-1.3z^{-1}+0.36z^{-2})$ is illustrated in FIG. 17. FIG. 18 shows this is correctly characterised by the 2nd order IIR filter whose transfer function is: $(1-1.3z^{-1}+0.36z^{-2})/(1-0.1z^{-1})$.

Figure 10:
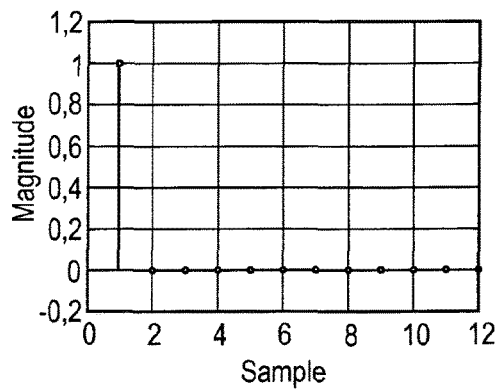
FIG. 10 shows vector y when a=0.5.
Figure 19:
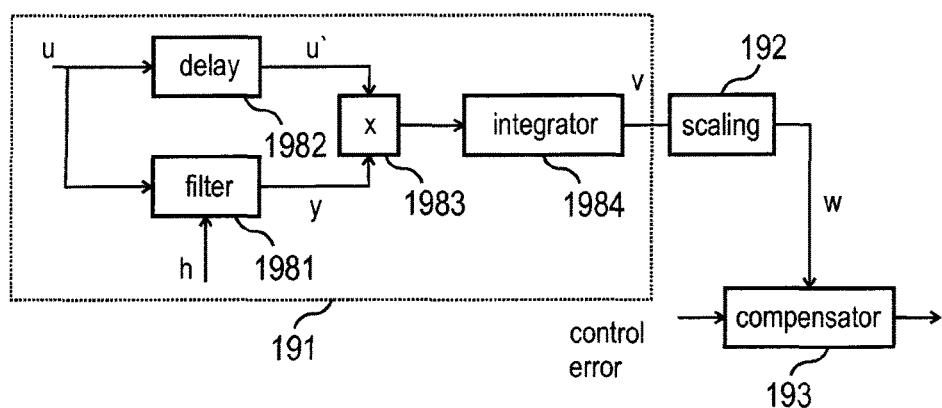
FIG. 19 shows an automatically tunable compensator.

The output of the characterisation system of FIG. 10 may be used to adjust a PID compensator as shown in FIG. 19, where the compensator block 193 is a component of a DC-DC converter and the scaling block interfaces 192 the characterisation block 191 to the compensator. The compensator 193 is adjusted by the adjustment value w. Components 1981, 1982, 1983 and 1984 inside the characterization block 191 correspond to the components 81, 82, 83, 84 as shown in FIG. 8.

The scaling block 192 may be suitably
 i) a linear time invariant gain;
 ii) a gain that is responsive to the magnitude of the signal being characterised (u) e.g. K/|u| where |u| represents the 2-norm of u or another suitable function. The advantage of (ii) is that the resulting signal from the characterisation block is amplified more if it is resulting from a small input signal u. Therefore it represents a greater requirement for adjustment in the compensator than if the same signal resulted from a large input signal u.

Figure 20:
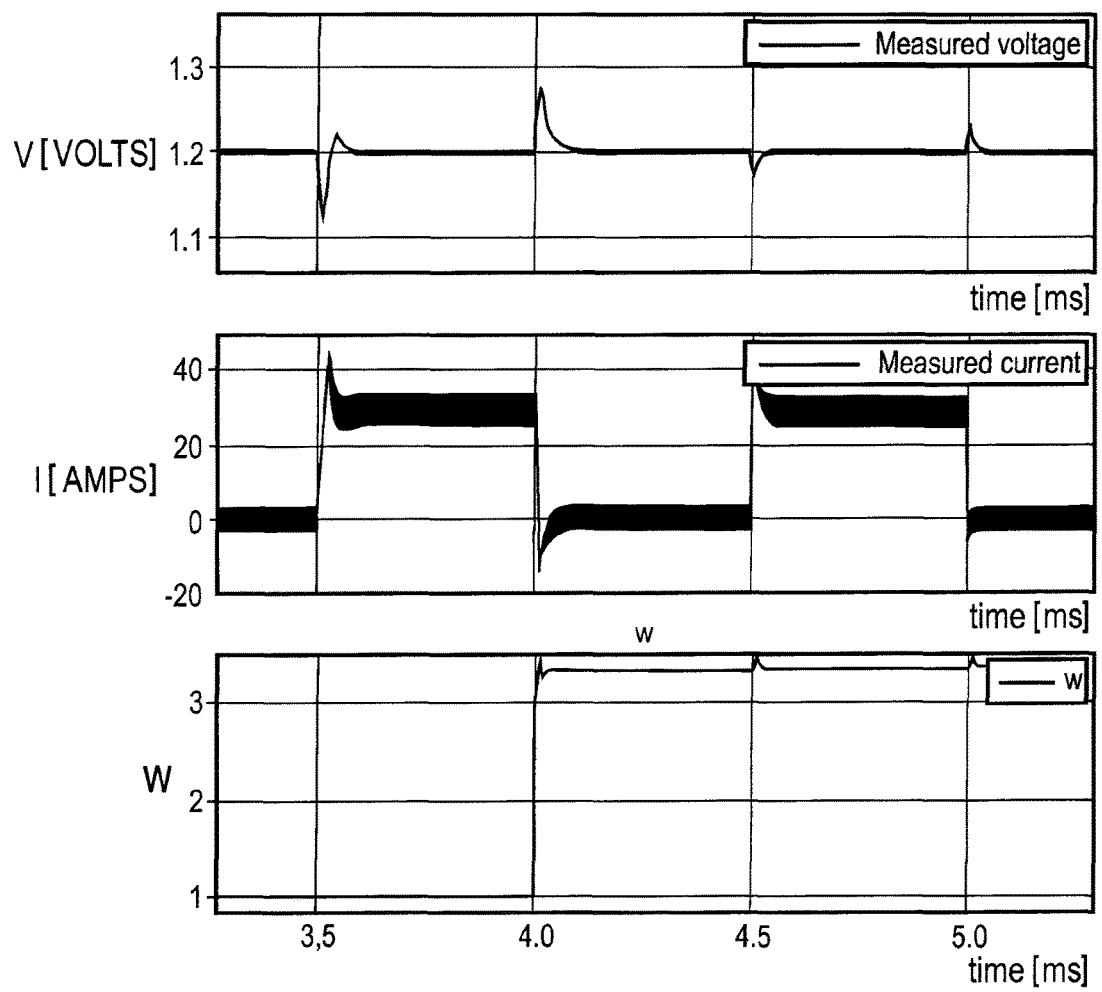
FIG. 20 shows the output voltage and inductor current of a buck converter with characterization turned on at 4.0 ms resulting in improved Load-Step response thereafter.

FIG. 20 shows the output voltage and inductor current of a buck converter with characterisation turned on at 4.0 ms resulting in improved load-step response thereafter. The adjustment value w is also shown to characterise the pulse immediately resulting in improved compensator tuning after only one load-step pulse, as required.

Because of the characterisation is carried out on the load-step pulse response as described it is clear that this method may operate with non-linear compensators, for example where different compensators are activated according to the system state at a specific instance in time, and furthermore is compatible with non-linear digital pulse width modulation restart techniques.

Following characterisation the adjustment value w may be stored in non-volatile memory to be applied when the converter is next powered up following power down. Also, the adjustment value, or the like, may be communicated over a communication bus, serial or parallel, to provide information regarding the characterisation of the response which would be useful in the design and quality control of the end power system. For example, if it was observed that the value had changed since the previous characterisation or was very different from expected then the user may be alerted to act accordingly, on an impending component failure for example.

The invention claimed is:

1. A control method for a power converter configured to generate an output voltage according to a control law controlling a power stage, the method comprising:
 identifying at least one parameter of the power stage during ramp up of the power converter;
 adapting the control law to the identified at least one parameter of said power stage for operating said power converter;
 determining a response of the power stage;
 identifying at least one other parameter of the power stage by characterizing the response; and further adapting the control law according to a characteristic of the response,
 wherein the power stage comprises an inductor and an output capacitor, and wherein the at least one parameter of a component of the power stage to be identified is the capacitance C, and wherein the capacitance C is determined by measuring an average inductor current $i_{L,AVG}$ during ramp up time $\Delta t$ and a voltage drop of said capacitance C at a start of the ramp up and at an end of the ramp up and computing $C=i_{L,AVG}*\Delta t/\Delta V$, wherein $\Delta V$ is a difference between a voltage drop of said capacitance C between the start of the ramp up and the end of the ramp up.

2. The control method according to claim 1 further comprising: continuously characterizing the response and continuously adapting the control law in response when operating the power converter.

3. The control method according to claim 1, wherein characterizing the response comprises determining a degree of matching between the response and an objective response by filtering the response to generate a filtered response and integrating a product of the filtered response and a delayed response.

4. The method according to claim 1, wherein further adapting the control law comprises adapting the control law such that the response matches the objective response.

5. The method according to claim 3, wherein the delayed response is delayed by one sample.

6. The method according to claim 3, wherein filtering the response comprises using an inverse filter of the objective response such that a response that exactly matches the objective response results in a zero output from the filter apart from a first sample of the filtered response.

7. The control method according to claim 1, wherein adapting the control law comprises re-parameterizing control parameters of the control law with respect to the identified parameter, and scaling control parameters according to a deviation of the identified parameter from an expected value of the at least one parameter of said power stage.

8. The control method according to claim 7, wherein adapting the control law further comprises normalizing the identified control parameter by the expected value of said control parameter for obtaining a normalized identified parameter and scaling control parameters according to a deviation of the normalized identified parameter from a normalized expected value of the at least one parameter of said power stage.

9. The method according to claim 1, wherein said control law is defined by a transfer function having a plurality of zeros and poles and wherein said plurality of zeros and poles of said transfer function is determined on the basis of an expected value for the at least one parameter of said power stage prior to identifying the at least one parameter of the power.

10. The control method according to claim 9, wherein after determining the at least one parameter of the power stage, the plurality of zeros and poles of the transfer function is adapted according to the identified at least one parameter of the power stage.

11. The control method according to claim 10, wherein a gain or a zero or a pole of the transfer function is scaled according to deviation of the identified parameter from an expected value of the at least one parameter of said power stage.

12. The control method according to claim 1, wherein the average current $i_{L,AVG}$ is corrected by measuring average inductor current when ramp up has finished and subtracting said average inductor current measured after ramp up from the average inductor current during ramp up.

13. A power converter comprising a switched power stage controlled by a control law implemented by a compensator, means for identifying at least one parameter of said power stage during ramp-up of the power converter and means for adapting the control law of the compensator according to the identified at least one parameter of said power stage, wherein the means for adapting the control law comprise means for adapting, means for normalizing and means for scaling a parameter of the control law, the power converter further comprising means for determining a response of the stage;

means for identifying at least one other parameter of the power stage by characterizing the response; and wherein the means for adapting for the control law comprise means for further adapting the control law according to a characteristic of the response, wherein the power stage comprises an inductor and an output capacitor, and wherein the at least one parameter of a component of the power stage to be identified is the capacitance C, and wherein the capacitance C is determined by measuring an average inductor current $i_{L,AVG}$ during ramp up time $\Delta t$ and a voltage drop of said capacitance C at a start of the ramp up and at an end of the ramp up and computing $C = i_{L,AVG} * \Delta t / \Delta V$, wherein $\Delta V$ is a difference between a voltage drop of said capacitance C between the start of the ramp up and the end of the ramp up.

\* \* \* \* \*